United States Patent
Green et al.

[11] B 3,914,763
[45] Oct. 21, 1975

[54] HYBRID FILTER EMPLOYING DIGITAL TECHNIQUES AND ANALOG COMPONENTS AND AMTI RADAR EMPLOYING SAME

[75] Inventors: Herbert Green, Elmsford, N.Y.; Robert A. Guarino, Monroe; John H. Fitzgerald, Norwalk, both of Conn.

[73] Assignee: United Aircraft Corporation, East Hartford, Conn.

[22] Filed: Aug. 30, 1973

[21] Appl. No.: 392,894

[44] Published under the Trial Voluntary Protest Program on January 28, 1975 as document no. B 392,894.

[52] U.S. Cl. ............... 343/7.7; 235/152; 235/156; 328/167; 343/5 DP
[51] Int. Cl.² ..................... G01S 9/42; H04B 1/10
[58] Field of Search ............ 235/152, 156; 328/165, 328/167; 343/5 DP, 7.7

[56] References Cited
UNITED STATES PATENTS

| | | | |
|---|---|---|---|
| 3,370,292 | 2/1968 | Deerfield | 343/5 DP |
| 3,619,586 | 11/1971 | Hoff et al. | 235/152 |
| 3,737,900 | 6/1973 | Vehrs | 343/5 DP |
| 3,775,768 | 11/1973 | Lisle et al. | 343/7.7 |
| 3,795,877 | 3/1974 | Poole | 328/167 |
| 3,798,560 | 3/1974 | Taylor | 235/152 |

*Primary Examiner*—T. H. Tubbesing
*Attorney, Agent, or Firm*—M. P. Williams

[57] ABSTRACT

A filter employing the principles of digital filters representative of Z-transform solution of mth-order difference equations is implemented using analog components; arithmetic units are realized by resistive networks employed with operational amplifiers, and memory elements are realized by the use of switched capacitors. A particular embodiment comprises a cascade implementation of a Cauer or elliptic filter applied to range-gated clutter attenuation in an airborne moving target indicator (AMTI) radar; time sharing of arithmetic units among range bins, multiplexing of slow filters for achievement of faster overall system response, and electronically variable filter characteristics (through electronic component selection) are disclosed.

9 Claims, 10 Drawing Figures

FIG. 3

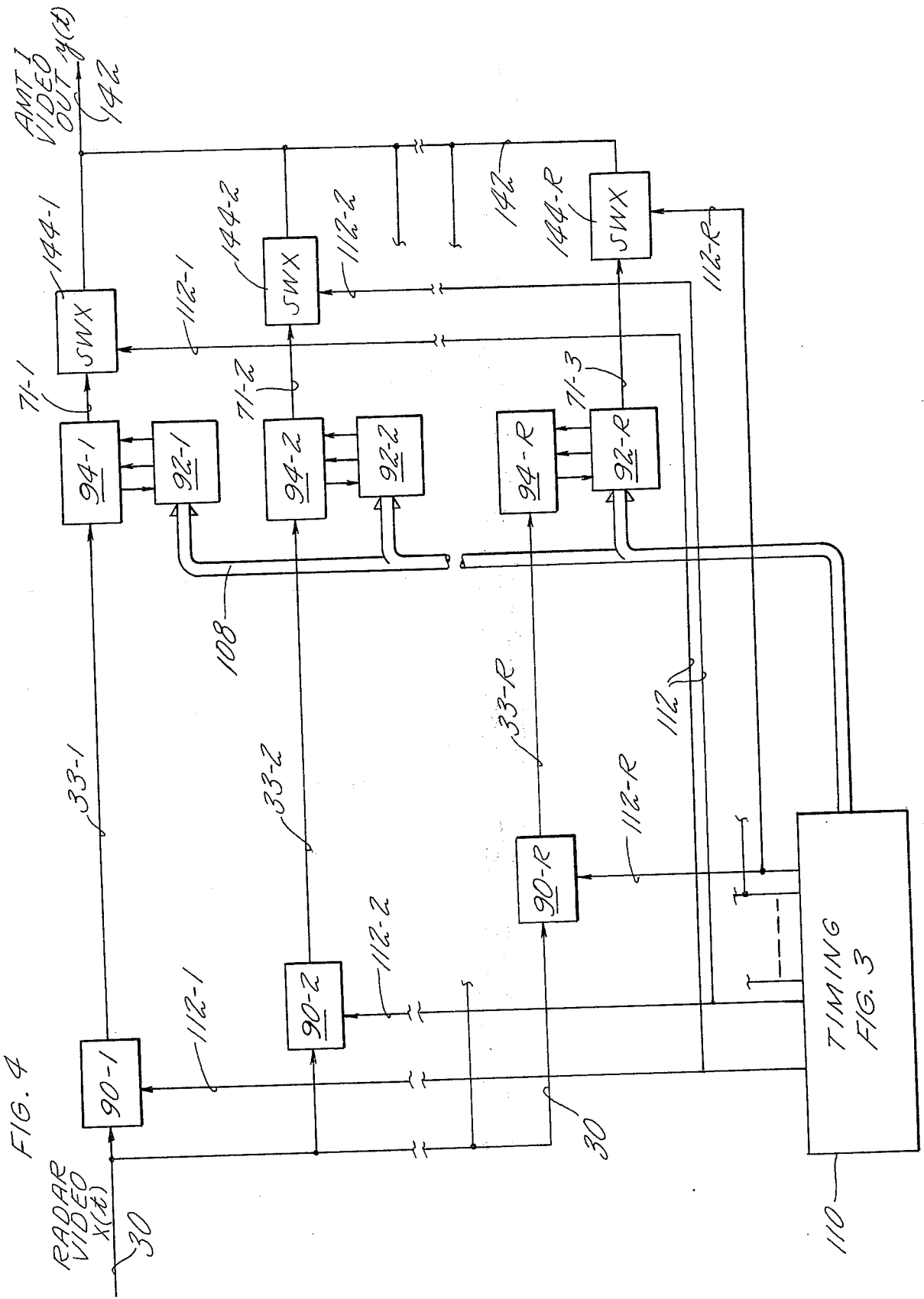

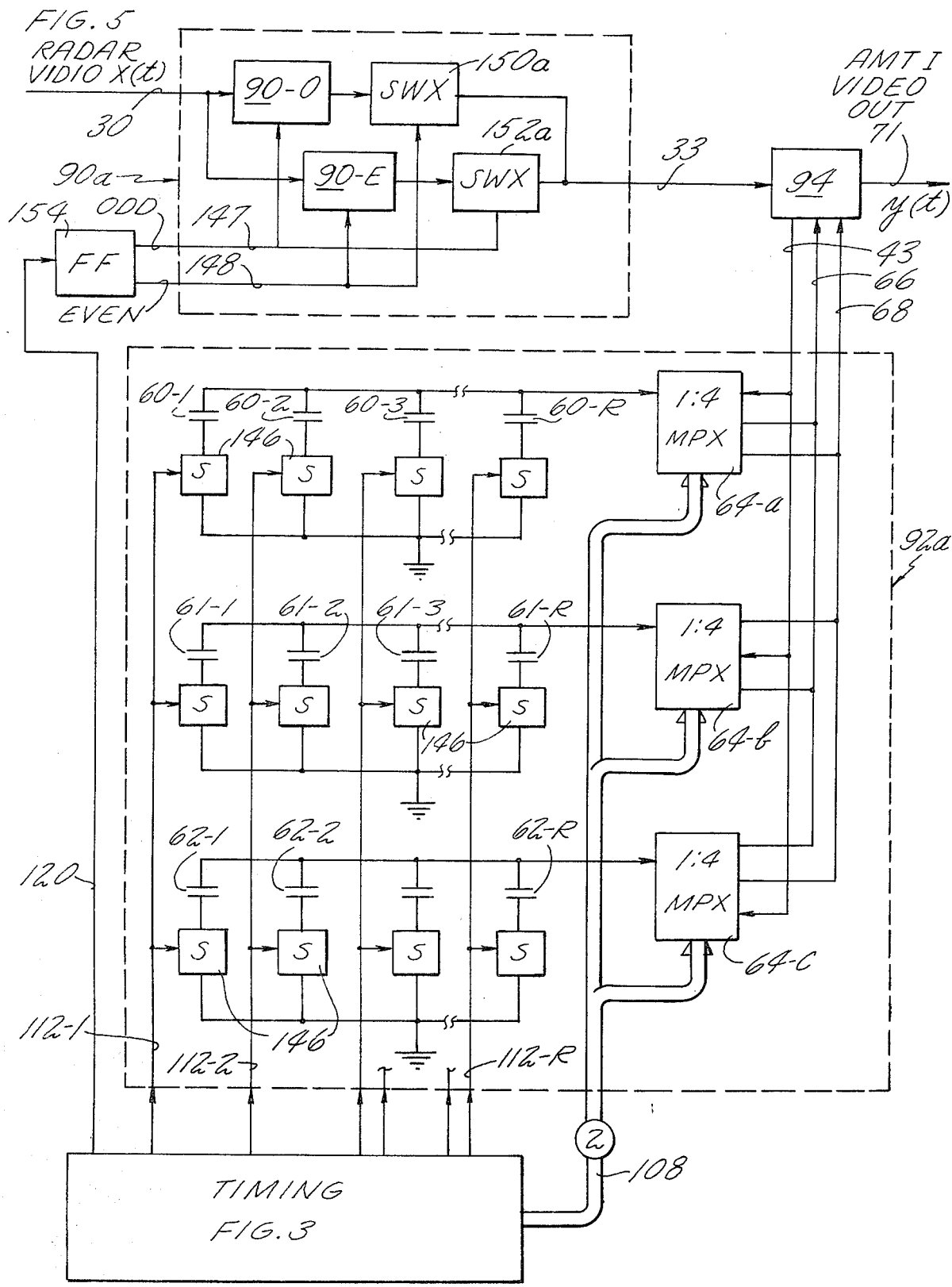

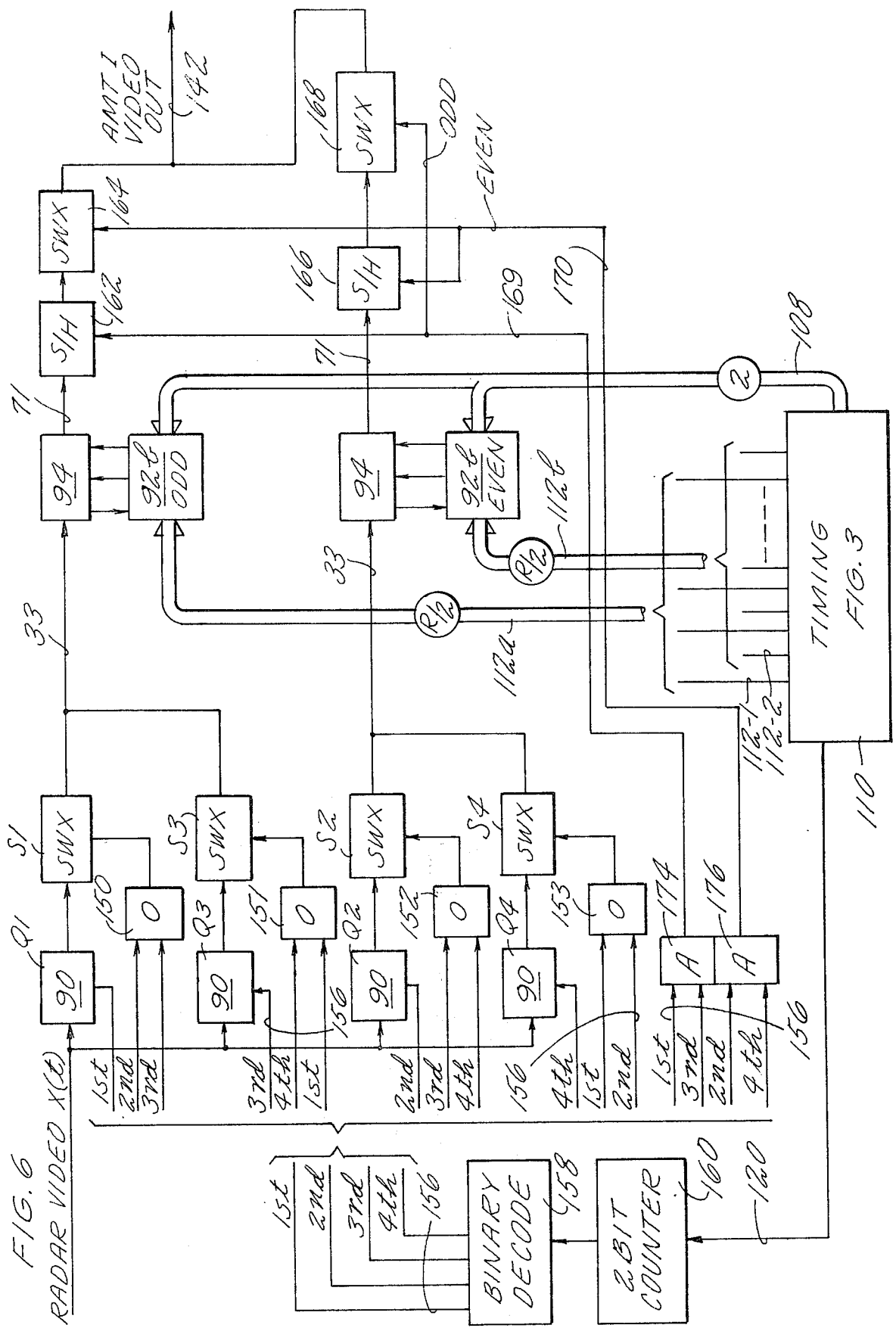

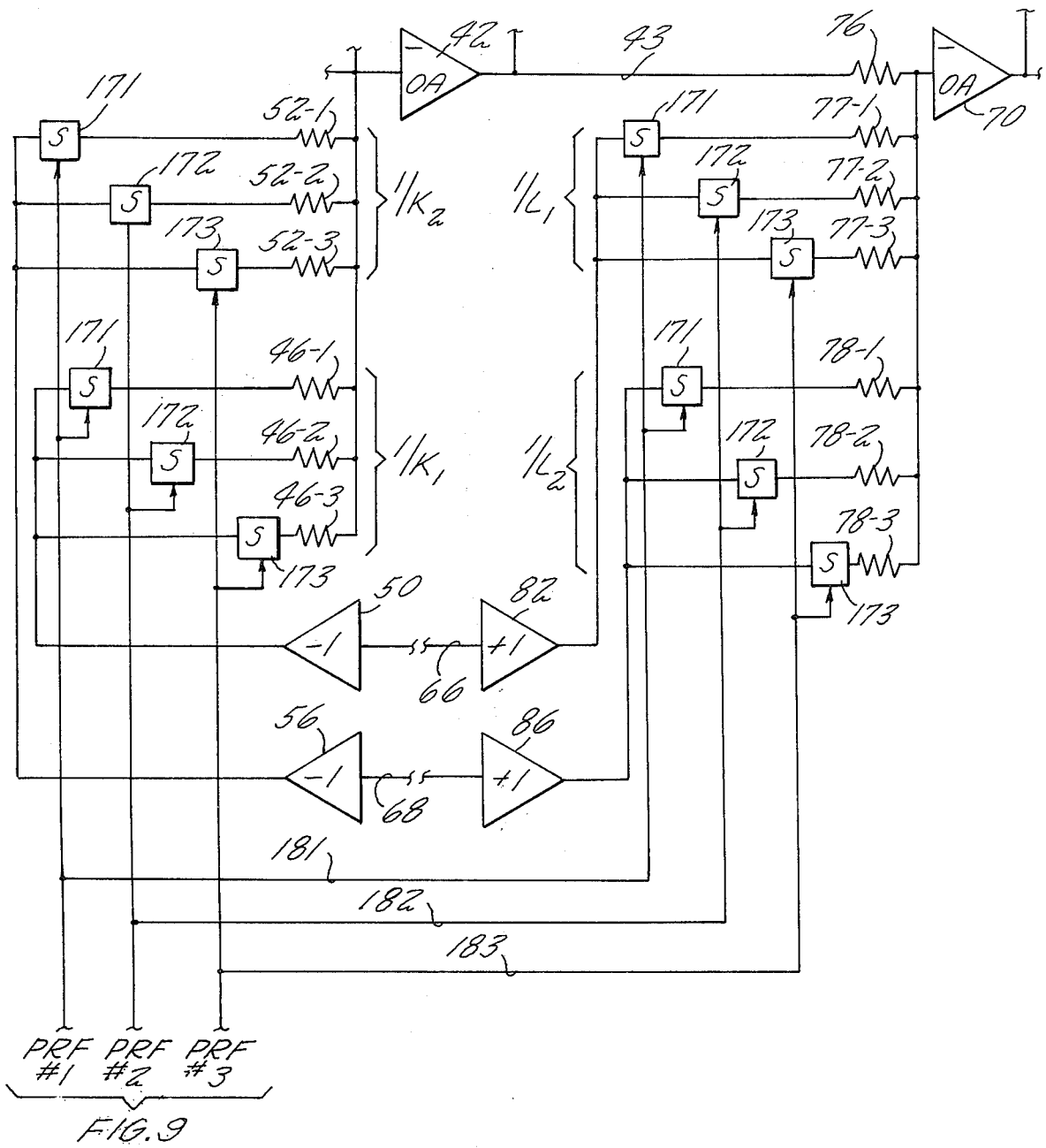

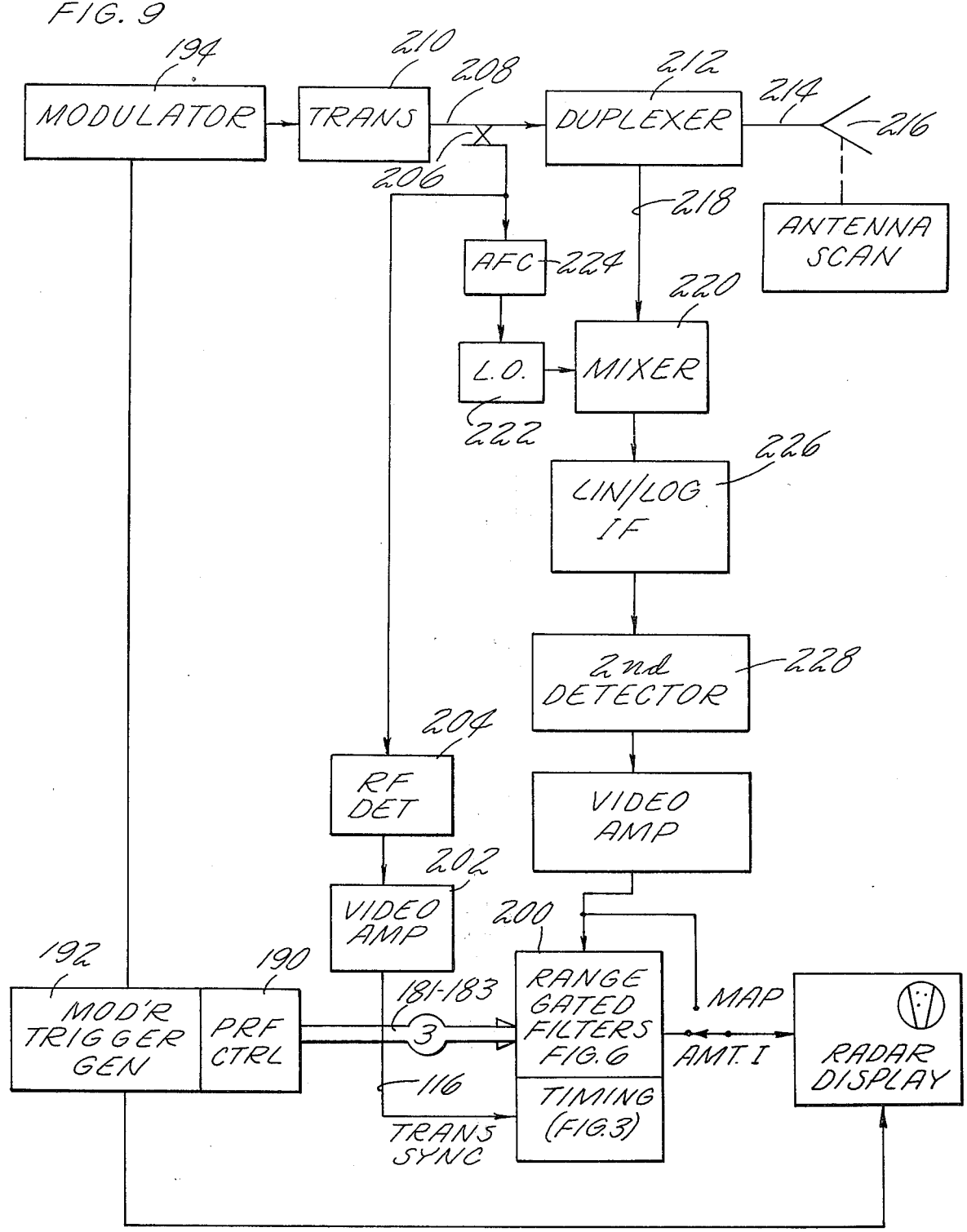

HYBRID FILTER EMPLOYING DIGITAL TECHNIQUES AND ANALOG COMPONENTS AND AMTI RADAR EMPLOYING SAME

BACKGROUND OF THE INVENTION

2. Field of Invention

This invention relates to filters, and further relates to radar, communications and sampled data systems employing filters.

2. Description of the Prior Art

One well known usage of filters having an infinite duration response (having, in general, poles and zeros) is in the attenuation of clutter in a range gated airborne moving target indicator (AMTI) radar. In such a radar, the return video from each transmitted pulse is sampled at a plurality of discrete times which are contiguous in a sequence, each of the times corresponding to a particular range increment or bin, each range bin having a duration substantially equal to the width of the transmitted pulse. The return video is thereby sorted out into a plurality of range channels (a function commonly referred to as range gating) in dependence upon the time of arrival of the return signal. The AMTI radar senses a moving target in any range bin by sensing the fact that the range bin has a video component including a doppler frequency caused by the relative motion between the radar and the moving target which is different from the nominal doppler frequency for terrain surrounding the moving target which is characterized by random return signals or clutter. As is known, the video signal produced by clutter has a doppler frequency having high spectral density near zero Hz, and in bands centered about the pulse repetition frequency (PRF) and harmonics thereof. The bandwidth of the clutter, that is the width or spread of the clutter spectrum, varies as a function of the angle between the antenna boresight and the ground track of the vehicle, so it is desirable to have the ability to alter the band reject characteristics of the range gated clutter filters in accordance with the aircraft velocity and/or the angle of antenna boresight off the ground track in order to have sufficient clutter attenuation without unduly limiting the pass-band which defines the breadth of perceptible doppler frequencies, and therefore the range of target velocities, which can be sensed. Similarly, it is desirable to vary the clutter frequency, by staggering the PRF, so as to provide the opportunity for sensing targets having velocities for which the doppler frequency falls into the clutter attenuation band at some PRFs, but not at others. Therefore, it is also desirable to have a filter in which the location of the zeros and poles (which determine the edges of the reject bands) can be adjusted or made adaptable as a function of the PRF of the radar.

Traditionally, filters of the past have been analog; that is, have consisted of passive impedances (such as capacitors, resistors and inductors, whether lumped or distributed), or have comprised active networks including amplifiers. However, such devices usually have broad rather than sharp skirts, are inherently extremely difficult and costly to make adaptable, and for the type of filters required in range gated AMTI radars, require a large number of components.

More recent filters include discrete filters which are implemented with digital signal handling techniques. Digital filters can produce very sharp attenuation skirts and are easily altered so as to vary the response, but they are expensive and complex. For instance, they require addition and multiplication, which involves the use of arithmetic units; a large amount of switching and complexity is required to make and use of one (or a few) arithmetic units, and such filters require a high capacity of storage, a large amount of which must be fast storage (such as scratch pad storage).

SUMMARY OF THE INVENTION

A principal object of the present invention is to provide an improved filter. An ancillary object of the present invention is to provide a filter having the advantages of discrete digital filtering, but which is less complex and expensive.

A further object of the present invention is to provide improved range gated clutter filtering in an AMTI radar.

According to the present invention, a stable, discrete, recursive filter employing the principles of digital filters representative of Z-transform solution of mth-order difference equations may be implemented in the cascade or parallel form utilizing analog components; arithmetic units are realized by resistive networks employed with operational amplifiers, and memory elements are realized by the use of switched capacitors.

An exemplary embodiment comprises a recursive cascade filter unit.

According futher to the present invention, the summing amplifiers utilized to perform arithmetic operations in a multiple-filter configuration are time shared among a plurality of filters, thereby reducing the amount of required apparatus and the attendant cost thereof.

In further accord with the present invention, a plurality of filters can be operated in overlap fashion by employing multiplexing techniques, thereby to provide an overall system response which is faster than the individual filter response. In still futher accord with the present invention, filter characteristics are adaptable through the simple expedient of selecting alternative ones of a small number of components.

Filters implemented in accordance with the present invention do not require frequent, critical readjustment of components. Cost effectiveness is achieved not only through the use of a large number of similar circuits and components, but also by means of time-shearing of the sampling circuits and summing amplifiers used as arithemetic units. Filters in accordance with the invention are versatile, and have characteristics which are easily adaptable to suit various needs.

Further, filters in accordance with the present invention require no A/D or D/A conversion, thereby avoiding resulting cost and quantization noise. Use of analog signal levels requires considerably fewer memory elements than would be required to accommodate an equivalent number of digital words of many bits each. A filter in accordance herewith can provide relatively flat pass-bands and steep skirts.

Because of the aforementioned advantages of the present invention, a range gated AMTI radar employing the filter of the present invention yields a higher probability of detection than do AMTI radars which utilize conventional delay line filter units. An AMTI radar employing the filters of the present invention is capable of detecting vehicles having a wider range of velocity, at greater angles off ground-track, and over a greater range of radar platform speeds.

Apparatus in accordance with the present invention is simple to operate, has a high reliability, and is easily adapted to a wide variety of uses in radar, communications, and sampled-data systems.

Other objects, features and advantages of the present invention will become more apparent in the light of the following detailed description of preferred embodiments thereof, as illustrated in the accompanying drawing.

BRIEF DESCRIPTION OF THE DRAWINGS

FIG. 4 is a simplified block diagram of an AMTI radar employing a plurality of filters in accordance with the embodiments of FIGS. 1–3;

FIG. 5 is a schematic block diagram of time sharing of portions of the apparatus through multiplexing so as to reduce the hardware requirements from that of the embodiment of FIG. 4;

FIG. 6 is a schematic block diagram of a modification of the embodiment of FIG. 5 in which overlapped operation is employed;

FIG. 8 is a partial schematic diagram illustrating an example of adaptability of filter characteristics through selection of different components;

FIG. 9 is a simplified block diagram of an AMTI radar in which the various embodiments herein may be employed, by way of example.

DESCRIPTION OF THE PREFERRED EMBODIMENT

Figure 1:
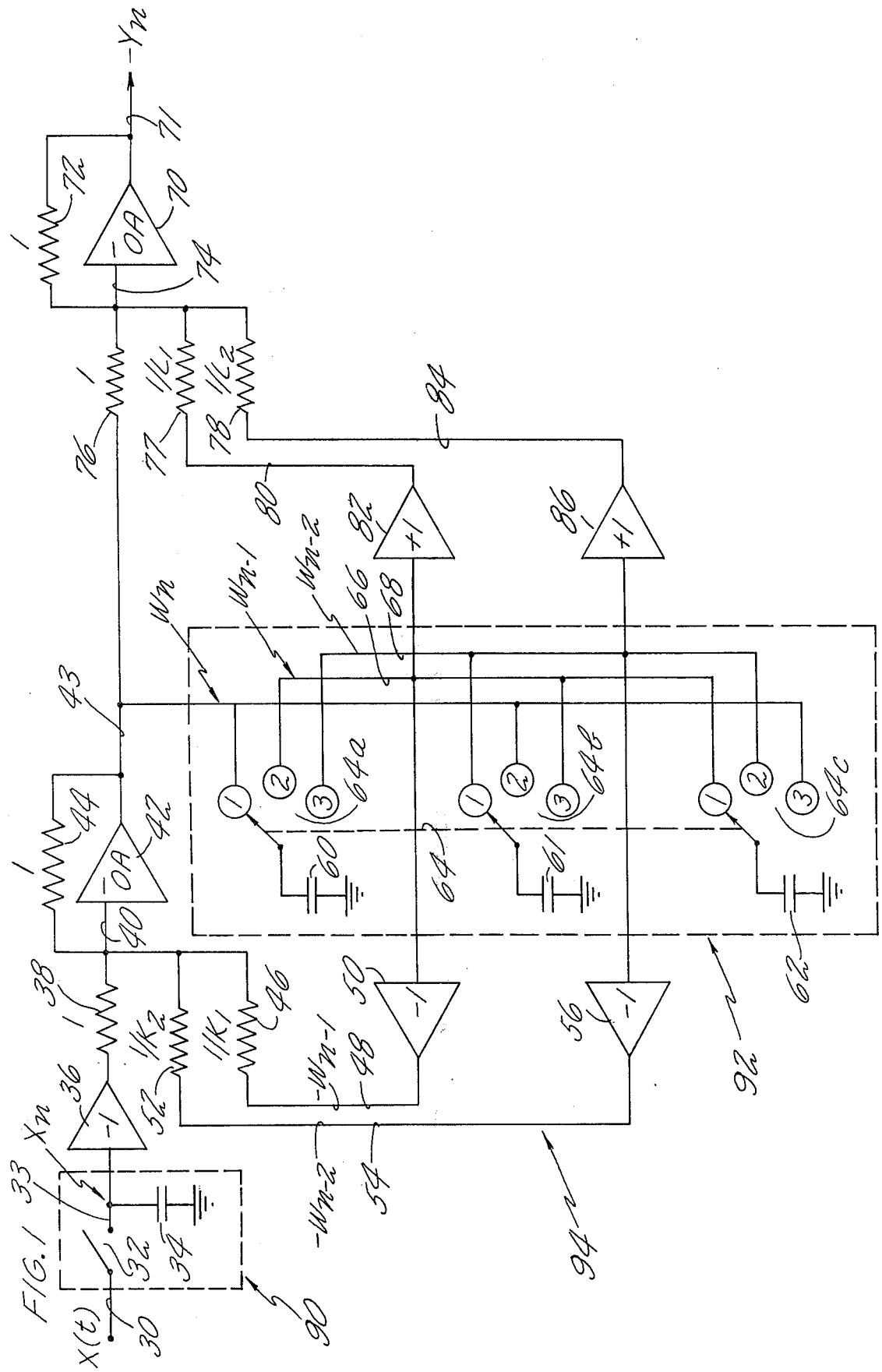
FIG. 1 is a schematic diagram of a simple, illustrative embodiment of the present invention.

As stated hereinbefore, the present invention is predicated on our discovery that the advantages of a digital filter can be obtained by implementing a recursive or non-recursive discrete filter developed as the solution of an mth-order difference equation by Z-transform techniques, in cascade or parallel form, while avoiding the cost and complexity of digital hardware by utilization of simple analog circuits.

The basic filtering techniques employed in the present invention are known, and are set forth in DIGITAL PROCESSING OF SIGNALS, Gold and Rader (MIT) McGraw Hill, 1969. In chapter two of Gold and Rader, the solution of mth-order difference equations by Z-transform techniques is developed, and is shown as two simultaneous difference equations (2.43) on page 41. These equations are repeated as equations (1) and (2) of TABLE I.

TABLE I $$w(nT) = x(nT) - \sum_{i=1}^{m} K_i w(nT - iT) \quad (1)$$

$$y(nT) = \sum_{i=0}^{r} L_i w(nT - iT) \quad (2)$$

$$3 \quad W_n = X_n + K_1 W_{n-1} + K_2 W_{n-2} \quad (3)$$

$$4 \quad Y_n = W_n + L_1 W_{n-1} + L_2 W_{n-2}. \quad (4)$$

where
 $X_n$ = the sampled input of $x(t)$ at time interval $n$
 $Y_n$ = the sampled output at time interval $n$
 $K_i, L_i$ = weighting coefficients of the filter
and
 $W_{n-i}$ = a sampled signal, internal to the filter, at time interval $n-i$ (where $1 \leq i \leq m$, and $m$ — order of the filter).

For the case of a second order filter, in which $m = 2$, and for simplicity letting ($nT$) be designated by the subscription, these equations can be written alternatively as equations (3) and (4) of TABLE I. Gold and Rader show (pages 41 through 46) that canonic, cascade, parallel, and coupled filter mechanizations of these equations are realizable. However, in accordance herewith, cascade and parallel mechanizations are strongly preferred due to improved stability and sensitivity characteristics. In particular, an implementation of a Cauer or elliptic filter based on a cascade of 2nd order ($m=2$) recursive filters is described as an example hereinafter.

In equations (3) and (4), the upper case is used to denote W, X and Y since these are in fact quantized signals existing across a given time interval, rather than the time varying signals from which equations (1) and (2) are derived in Gold and Rader.

The signs of equation (3) herein appear at first glance to be different from the signs of equation (1): however, that is because the convention used herein is for the constants $K_1$ and $K_2$ to themselves be positive, whereas in Gold and Rader, negative feedback constants ($-K_1 \ldots -K_m$) are envisaged.

The implementation of equations (3) and (4) is illustrated in FIG. 1. Therein, the signal to be filtered, $x(t)$, is applied on an input signal line 30 to a sampling switch 32 which closes during each of the successive n time periods, and when closed, causes the magnitude of the input voltage on the line 30 to be applied to a line 33 and stored in a capacitor 34. The magnitude of voltage in the capacitor 34 is equal to $X_n$ in equation (3) hereinbefore. This signal is passed through an inverting buffer amplifier 36, which has a very high input impedance so that the voltage on the capacitor 34 will not discharge during successive ones of the n time periods. Such an amplifier may readily comprise a field effect transistor. The output of the buffer amplifier 36 is applied to an input summing resistor 38 which in turn is connected to an inverting input 40 of an operational amplifier 42. The operational amplifier 42 has a feedback resistor 44 connected from its output 43 to the inverting input 40. As indicated in FIG. 1, the resistance of the resistor 38 bears a 1:1 ratio with the feedback resistor 44 so that the gain of the operational amplifier 42 with respect to the $-X_n$ signal from the buffer amplifier 36 is unity, thereby supplying the first term of equation (3), $X_n$, at the output 43 of the operational amplifier 42. As is developed immediately hereinafter, the operational amplifier 42 has a second input summing resistor 46 having a resistance which is $1/K_1$ times the resistance 44, which thereby causes the operational amplifier 42 to have a gain of $-K_1$ with respect to an input signal $-W_{n-1}$ on a signal line 48 which is supplied thereto by an inverting buffer amplifier 50. Similarly, the operational amplifier 42 has a third input summing resistor 52 which has a resistance of $1/K_2$ with respect to the feedback resistor 44 so that the operational amplifier 42 has a gain of $-K_2$ with respect to a $-W_{n-2}$ signal on a line 54 which is supplied thereto by an inverting buffer amplifier 56. Thus the output of the operational amplifier 42 on the line 43 is equal to $X_n + K_1W_{n-1} + K_2W_{n-2}$, and therefore is equal to $W_n$ of equation (3) hereinbefore.

The value of $W_n$ on line 43 is stored in successive ones of three storage capacitors 60, 61, 62 during successive ones of the n time periods. Thus successive ones of the first, second and third contacts are connected to the $W_n$ line 43, a $W_{n-1}$ line 66, and a $W_{n-2}$ line 68. The switch 64a steps through its three throws or positions in the order: 1st, 2nd, 3rd, 1st, 2nd, 3rd, etc. The timing of the switch 64 with respect to the sampling switch 32 is such that the switch 64 is advanced during a period of time when the sampling switch 32 is open. In the case of utilization of the filter of FIG. 1 in an AMTI radar, the switch 64 is advanced during dead time; that is, once for each transmitted pulse at a period of time which is so delayed from the transmitted pulse as to fall after the last possible range bin, and just before the next transmitted pulse. TABLE II (hereinafter) illustrates how the values in the capacitors 60–62 are built up starting with all of them reset, and also illustrates the different values of W in the capacitors when steady state operation is achieved.

Thus, the apparatus thus far described with respect to FIG. 1 generates the value of $W_n$ according to equation (3).

To generate the output function $Y_n$, an operational ampifier 70 has its output 71 connected through a feedback resistor 72 to its inverting input 74 along with three input summing resistors 76–78. The input summing resistor 76 is connected to the $W_n$ line 43 and has a resistance which is the same as that of the feedback resistor 72 so that the operational amplifier 70 provides a gain of minus one to the value of $W_n$. The input summing resistor 77 is connected to a buffered $W_{n-1}$ line 80 which is driven by a non-inverting buffer amplifier 82, the input of which is connected to the $W_{n-1}$ line 66. The resistor 77 has a resistance which is $1/L1$ times the resistance of the feedback resistor 72 so that the operational amplifier 70 provides a gain of $-L1$ to the $W_{n-1}$ signal. The input summing resistor 78 is connected to a buffered $W_{n-2}$ line 84 which is fed by a non-inverting buffer amplifier 86 which responds to the $W_{n-2}$ line 68. The resistor 78 has a resistance which is $1/L2$ times the resistance of the feedback resistor 72, so that the operational amplifier 70 provides a gain of $-L2$ to the $W_{n-2}$ signal. For

TABLE II

| n | Swi-64 | 34 | 60 | 61 | 62 |
|---|---|---|---|---|---|
| 1 | 1 | $X_1$ | $X_1$ | 0 | 0 |
| 2 | 2 | $X_2$ | $X_1$ | $X_2+K_1X_1$ | 0 |
| 3 | 3 | $X_3$ | $X_1$ | $X_2+K_1X_1$ | $X_3+K_1(X_2+K_1X_1)+K_2X_1$ |
| . | . | . | . | . | . |
| . | . | . | . | . | . |
| . | . | . | . | . | . |
| 15 | 3 | $X_{15}$ | $W_{13}$ | $W_{14}$ | $W_{15}$ |
| 16 | 1 | $X_{16}$ | $W_{16}$ | $W_{14}$ | $W_{15}$ |
| 17 | 2 | $X_{17}$ | $W_{16}$ | $W_{17}$ | $W_{15}$ |
| 18 | 3 | $X_{18}$ | $W_{16}$ | $W_{17}$ | $W_{18}$ |

TABLE II-Continued

| n | Swi-64 | 34 | 60 | 61 | 62 |
|---|---|---|---|---|---|
| 19 | 1 | $X_{19}$ | $W_{19}$ | $W_{17}$ | $W_{18}$ |
| 20 | 2 | $X_{20}$ | $W_{19}$ | $W_{20}$ | $W_{18}$ |
| 21 | 3 | $X_{21}$ | $W_{19}$ | $W_{20}$ | $W_{21}$ | the buffer amplifiers 36, 50, 56, 82 and 86, high input impedance amplifiers are utilized to isolate the capacitors 34 and 60–62 so that the charge thereon is not depleted by any appreciable amount within any of the n time periods. Thus it is seen that the operational amplifier 70 provides at its output 71 a value $-Y_n$, which is the negative of $Y_n$ as set forth in equation (4) hereinbefore. To achieve $Y_n$, the signal on the line 71 may be fed through an inverting amplifier if desired. In any given design, it is possible to combine several such 2nd order filter sections to achieve a desired reliable composite response characteristic. Cascade design sections are connected in series, and parallel design sections are combined in parallel. Notice that, with all positive inputs, the operational amplifier 70 supplies a negative output since all of the inputs are applied to its inverting input in order to permit degenerative feedback. An alternative approach is to operate the amplifier 70 in the fashion similar to the amplifier 42, by providing an inverting buffer amplifier in the line 43 between the amplifier 42 and the resistor 76, and by choosing the amplifiers 82, 86 to be inverting as well. This then would provide positive $Y_n$ at the output 71.

The switches 32, 64 are preferably electronic switches, such as bipolar or field effect transistors, or diode quads. The switch 64 may in fact comprise multiplexer circuits which are readily available in integrated circuit form from a number of suppliers. For operation of the filter of FIG. 1, all that is required is that the switch 64 be advanced and the circuit settling time to have elapsed, after which the switch 32 is closed and then the switch 32 is opened, after which an output is derived, and then the switch 64 can again be advanced for the next of the n periods. Switching signals for the switch 64, and the nature of the circuits and the timing is described more fully hereinafter with respect to FIGS. 2 and 3.

Examination of FIG. 1 shows that the switch 32 (with suitable timing) and the capacitor 34 comprise a quantizer 90, the capacitors 60–62 and the switch 64 comprises an internal storage unit 92, and the remainder of FIG. 1 comprises an arithmetic unit 94. This is brought out more fully in FIG. 2 wherein the quantizer 90 is illustrated as being a sample and hold circuit, although it should be appreciated that such sample and hold circuit could comprise a type readily available in the art, or it could be comprised of a capacitor and an electronic switch as described hereinbefore. The arithmetic unit 94, subject to the inversion of $Y_n$ referred to hereinbefore, which is trivial, is shown in equivalent form in FIG. 2 to be the equivalent of a pair of summing networks 96, 98 and scale factor circuits 100–103.

Figure 2:
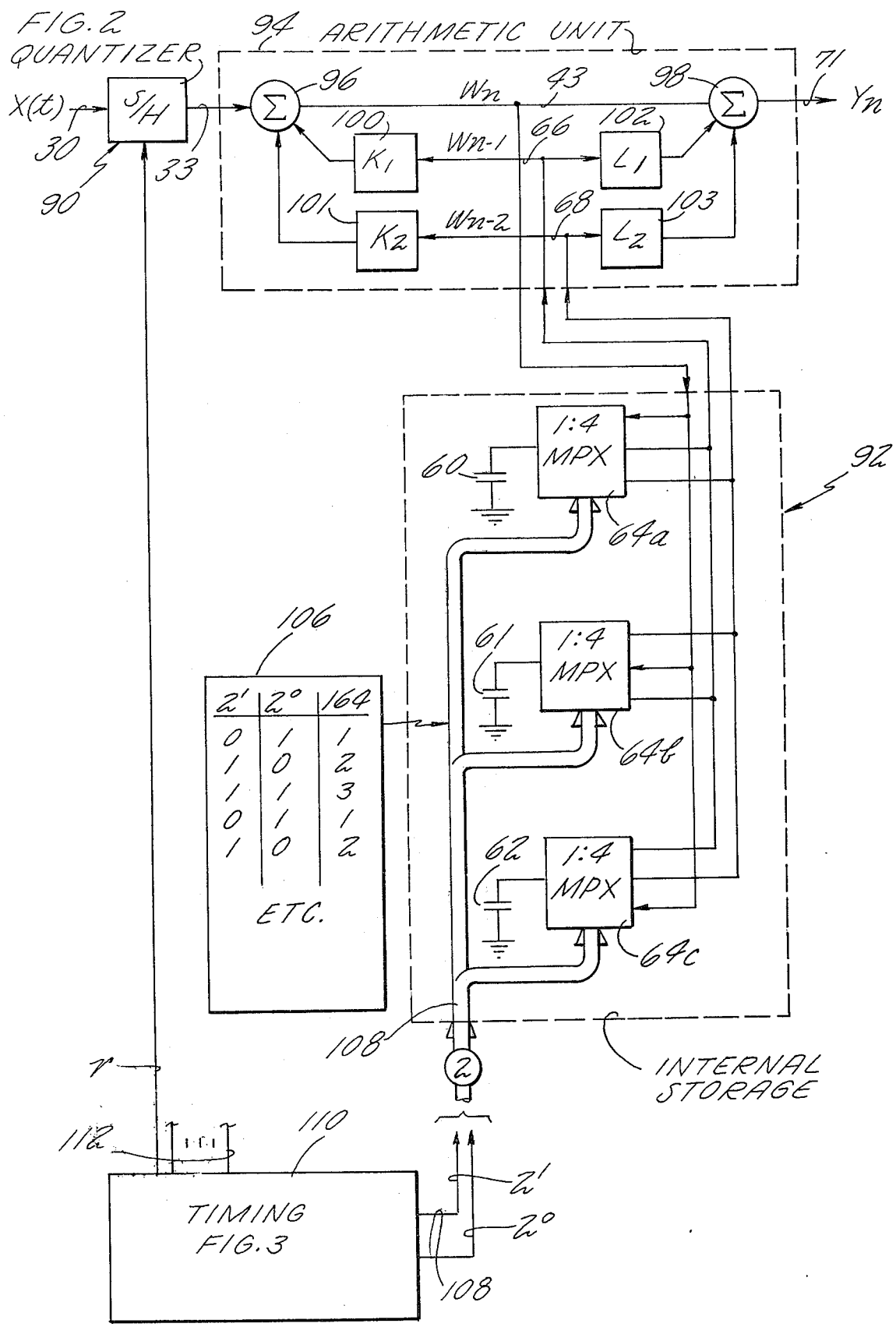
FIG. 2 is a schematic diagram further descriptive of the embodiment of FIG. 1.

In FIG. 2, the internal storage unit 92 is shown with the switch 64 implemented by three 1:4 multiplex circuits, each of which responds to a pair of binary input bits of value $2^0$ and $2^1$ so as to advance sequentially through positions 1, 2, 3, 1, etc. as described hereinbefore. One manner of providing correct binary bits is to utilize a three ring counter in which a ZERO, ZERO output is prohibited so that the multiplexers utilize ONE, TWO, and THREE outputs, and ignore the ZERO output, under control of the two binary bits as shown in a truth table 106 in FIG. 2. The two binary selection signals may be applied by a pair of lines 108 from a timing unit 110, which is described more fully with respect to FIG. 3 hereinafter, which also supplies an r signal on a line 112 to activate the quantizer 90 in a manner equivalent to closing the switch 32 as seen in FIG. 1. The r signal on the line 112 (FIG. 2) denotes a signal relating to the rth range bin in an AMTI radar, in which case the signals on the line 108 are changed only after the maximum range (highest ordered range bin) has been reached for each transmitted pulse.

Figure 3:
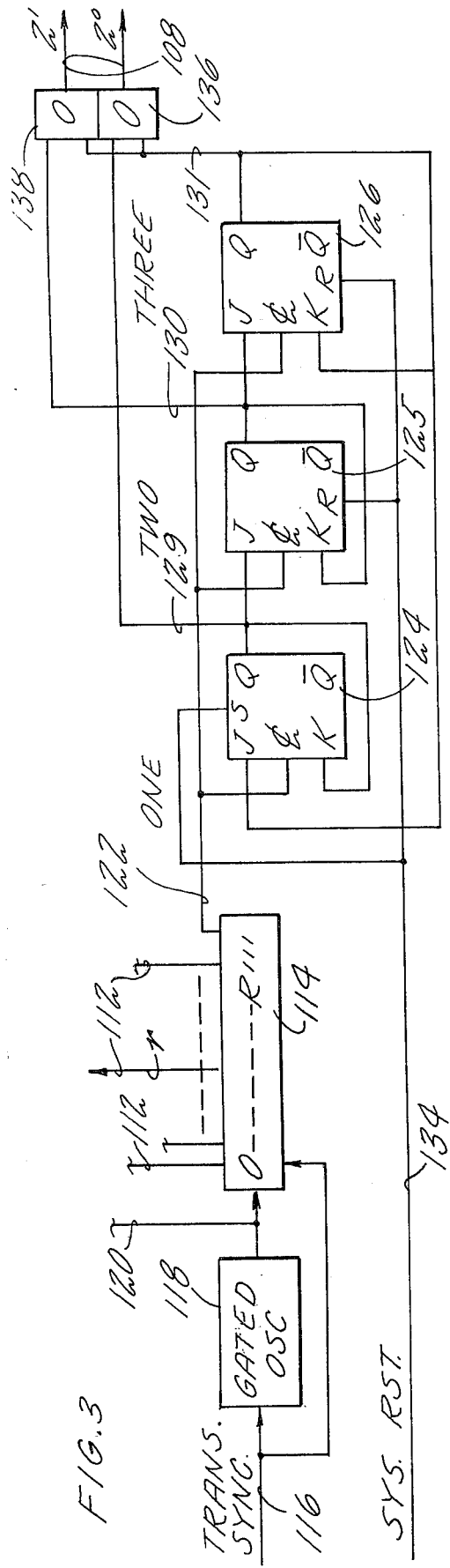
FIG. 3 is a schematic diagram of timing circuitry which may be utilized in various embodiments herein.

The timing circuit 110 is shown in more detail in FIG. 3. Therein, the quantizer activating signals on the lines 112, each of which relates to a particular range bin, r, are generated by a suitable timing ring or counter 114 which may be of the closed ring type, or may be reset to zero by a transmitter pulse synchronization signal on a line 116, which is also utilized to cause a gated oscillator 118 to provide signals on a line 120 for advancing the ring 114. The signals on the lines 120 are spaced from each other by a time increment substantially equal to the pulsewidth of the radar, as is known in the art. Thus, for each transmitted pulse, the ring 114 counts successively from zero to R to provide a sequence of signals on the lines 112, each of which defines one successive range bin. The ring 114 may be provided with additional counting capacity so that after a range of R is reached, it will supply a switch incrementing signal on a line 122 which is used as a clock signal for edge-gating of a plurality of JK flip flops 124–126 which comprise a three stage ring 128. Each of the JK flip flops has its Q output connected by a corresponding line 129–131 to its own K input and to the J input of the next flip flop thereto in a sequence. As is noted, the flip flop 124 corresponds with position 1 of the switch 64 (FIG. 1), the flip flop 125 corresponds with position 2 of switch 64, and the flip flop 126 corresponds with position 3 of switch 64. Although it is totally immaterial which switch position is considered the starting position, for unambiguous operation of the three stage ring 128, it is preferable to preset the ring so that one of the flip flops is on and the other two are off. In FIG. 3 this is achieved by utilizing a system reset signal on a line 134 to force the flip flops through their overriding DC inputs so that the first flip 124 is set, and the other two flip flops are reset. The system reset signal on the line 134 is required only when starting up operation of the circuitry therein, such as when an AMTI radar is turned on. The output of the three stage ring is applied to a pair of OR circuits so as to binary encode the three stage ring in the manner described with respect to the truth table 106 of FIG. 2 hereinbefore. An OR circuit 136 generates the $2^0$ signal in response to the flip flop 124 being set, or in response to the flip flop 126 being set, and an OR circuit 138 generates the $2^1$ signal in response to the flip flop 125 being set, or in response to the flip flop 126 being set. This provides a progression of 0, 1; 1, 0;1, 1; 0, 1; and so forth, as seen in the truth table 106 (FIG. 2). Thus these signals will cause the multiplex switches 64 to advance from position 1 to position 2 to position 3 to position 1 and so forth as seen in the truth table 106 (FIG. 2). If desired, the range gating ring 114 may be of a type similar to the three stage ring 128.

A conventional method of providing range gated doppler filtering in an AMTI radar is to provide one filter (of the type shown in FIGS. 1 and 2) for each range bin, as is illustrated in FIG. 4. In FIG. 4, each of the range bins, 1, 2, ... R includes a quantizer 90, an internal storage unit 92 and an arithmetic unit 94. However, there is only one timing unit 110 for the entire array. The signals that control the stepping of the switches 64 for each range bin are provided by the two signal lines 108; in other words, the same switching control signals can be utilized for all range bins. On the other hand, the quantizers 90 are each connected to a corresponding one of the signal lines 112 so as to be activated only during the time commensurate with the related range bin. In order to provide a single AMTI video output signal on a line 142, each range bin is provided with a switch 144 which is actuated to pass the signal output of the corresponding filter on the lines 71 to the output line 142 in synchronism with actuation of the related quantizers 90, in response to the related range-defining signals on the lines 112. Even in the configuration of FIG. 4, the present invention provides a certain measure of cost effectiveness since the content of each of the circuits 90, 92, 94 is the same in each range bin as in every other range bin. However, much greater efficiency in circuit usage can be achieved by time sharing of certain of the components, as is illustrated in FIG. 5.

In FIG. 5, a range gated filter for an AMTI radar includes only one arithmetic unit 94 for all range bins, and a multiplexed internal storage unit 92a includes only one set of selector switches 64a–64c, but there is provided one of each of the capacitors 60–62 for each range bin. To achieve this, a plurality of switches 146 (which are preferably electronic switches such as transistors or diode quads) are selectively closed in response to corresponding range bin timing signals on the lines 112. Thus during the time of the first range bin as denoted by a signal on a line 112-1, the related switches 146 connect the capacitors 60-1, 61-1, and 62-1 to ground, thereby causing them to be actively connected with the selector switches 64a–64c for operation, during the period of the first range bin, as described hereinbefore with respect to FIG. 1. Then, during the second range bin, the capacitors 60-1, 61-1 and 62-1 are disconnected, and the signal on the lines 112-2 causes related switches 146 to connect the capacitors 60-2, 61-2 and 62-2 to ground so that they operate during the period of the second range bin with the selector switches 64a–64c, and so forth. As described hereinbefore, the switches 64a–64c are advanced during the dead time for each transmitted pulse.

In order to provide a stable signal on the line 33 at the input to the arithmetic unit 94 for a full range bin, a gated, dual quantizer 90a is provided. The dual quantizer 90a includes two quantizers 90-O and 90-E which are operated alternately in response to odd and even signals on a pair of lines 147, 148. The output of each quantizer is selectively connected to the input line 33 by means of electronic switches 150a, 152a which are operated alternately by the even and odd signals on the lines 148, 147. Thus when the odd quantizer 90-O is operated to sample the radar video input on the line 30, its output switch 150a is not closed, but the output switch 152a is closed so that the previously sampled voltage in the quantizer 90-E is connected to the input line 33. The odd and even signals on the lines 147, 148 are generated by a flip flop 154 in response to the output of the gated oscillator 118 (FIG. 3) on the line 120. Thus, the flip flop 154 changes state for each successive range signal generated on the lines 112. Because of the fact that it is immaterial which quantizer is used for which range bins, no additional synchronization of the flip flop 154 is required.

Figure 7:
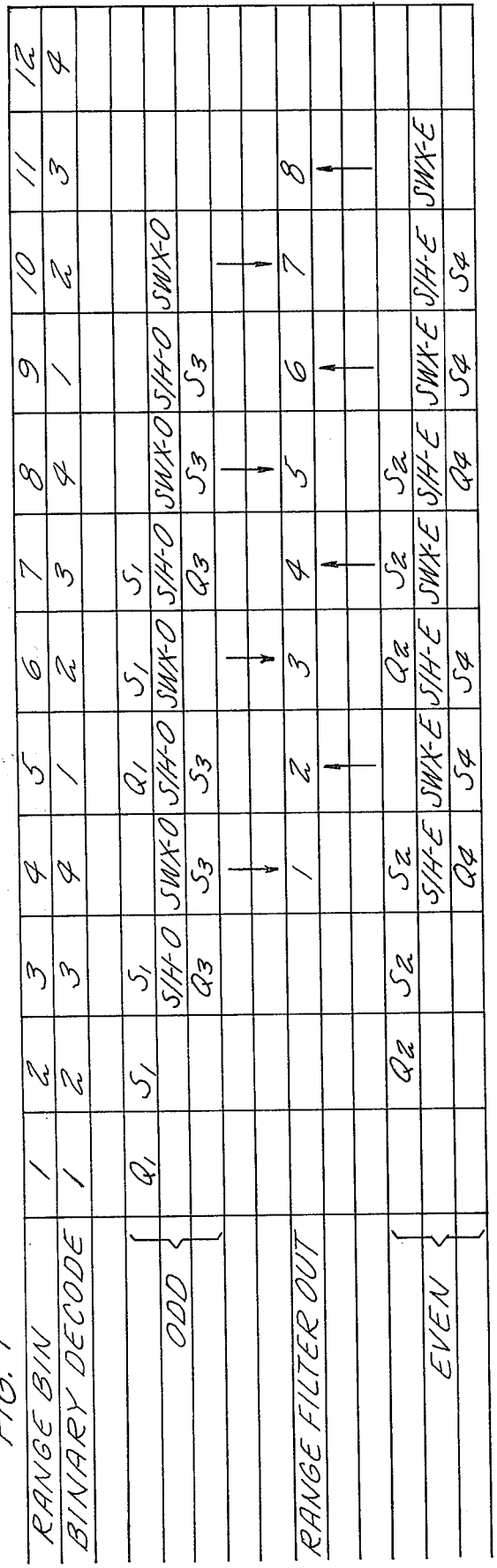
FIG. 7 is a diagram illustrative of operation of the embodiment of FIG. 6.

The circuit of FIG. 5 achieves a great saving in hardware since the per-range-bin requirement is simply three capacitors 60–62 and three related switches 146. However, depending on the time duration of a range bin, in some circumstances it may be that there is insufficient time during each range bin for the circuit to fully settle, in consideration of time necessary to change the charge on capacitors, operate switches, and so forth. In such a case, multiplexing of units similar to FIG. 5 can be achieved in a manner described with respect to FIG. 6. Therein, an odd channel and an even channel each has its own quantizer, arithmetic unit 94 and internal storage unit 92b. The internal storage units 92b are the same as the internal storage unit 92a illustrated in FIG. 5 except that each need have only sufficient capacitors 60-62 and switches 146 for half of the range bins. In the embodiment of FIG. 6, processing by each arithmetic unit 94, 92b is allowed to proceed for a two range bin period, the odd and even processors working in an overlapped fashion. The input quantizers 90, which are referred to in FIG. 6 as Q1 through Q4 are each provided with a related switch S1 through S4. Each of the switches is controlled by a related OR circuit 150–153 in response to selector timing signals on a plurality of lines 156. The signals on the lines 156 are generated by a binary decode circuit 158 in response to a two bit binary counter 160 which is advanced in response to the output of the gated oscillator (FIG. 3) on the line 120, thereby causing the 1st, 2nd, 3rd, 4th signals to cycle along with the range bin signals on the lines 112. As illustrated in FIG. 7, the first range bin (and the 5th, the 9th, etc.) is sampled by the first quantizer 90, Q1, during 1st time, and thereafter the switch S1 applies Q1 to the odd processor on the line 33 by being closed during 2nd and 3rd time, during which time processing in the odd channel proceeds. In the second half of the processing time (time 3 for the processing of range bin 1) a sample and hold circuit 162 is operated so as to sample the output of the odd processor on the line 71, and then in the 4th time period a switch 164 connects the output of the sample and hold circuit 162 to the AMTI video output line 142. During 2nd time, the 2nd quantizer 90, Q2, samples the radar video for the second range bin, and this is passed by the switch S2 to the input of the even processor on the line 33 during 3rd and 4th times. In 3rd time period, Q3 samples the video, and this is passed to the odd processor over the input line 33 during the 4th and 1st periods. Notice that each of the channels requires two quantizers and related switches since the information collected by quantizer 1 being processed in time periods 2 and 3 means that quantizer 1 is not available in time period 3 to be able to sample the radar video for the 3rd, 7th and so forth range bins. The even channel also has a sample and hold circuit 166 and an output switch 168 which are operated in a push pull relation with respect to the sample and hold 162 and switch 164 of the odd channel. These circuits are operated in response to odd and even signals on a pair of lines 169, 170 which are generated by related AND circuits 174, 176 in response to the timing signals on the lines on the lines 156. Notice in FIG. 7 that processing occurs during the time that any of the switches S1 – S4 is closed; that is when S1 is closed or S3 is closed the odd channel is processing, and when S2 is closed or when S4 is closed the even channel is processing.

FIG. 8 illustrates a modification of FIG. 1 which permits selecting from a plurality of different weighting resistor sets in response to a plurality of sets of switches 171–173, each set being selectable simply by applying a signal on a related control line 181, 182, 183. The signals are illustrated as relating to pulse repetition frequency (PRF No. 1 – PRF No. 3) since, as described hereinbefore, it may be desirable to alter the characteristics of the filter to optimize the AMTI performance of an associated radar in which the filter is employed; however, they may relate to functions of aircraft speed and antenna scan off ground-track. Notice that the selectability of filter characteristics as illustrated in FIG. 8 is greatly simplified in the embodiment of FIG. 6 since the resistors form a part of the arithmetic unit 94, and even in full multiplexed operation, only two arithmetic units are needed to satisfy a radar. The same signal lines 181–183 will control both the odd and even arithmetic units 94, in an apparatus of FIG. 6 having the selectable constants as illustrated in FIG. 8. The PRF control signals illustrated at the bottom of FIG. 8 are generated in a radar system of the type shown in FIG. 9.

A radar system which is capable either of displaying a map or of moving target indicator type operation, of a conventional type, is illustrated in FIG. 9 as including a PRF generator 190 that drives a modulator trigger generator 192 which drives a modulator 194. Therein, the range gated filters 200 of the type illustrated with respect to FIG. 6 (with the modification of FIG. 8) is illustrated as including the timing circuits of FIG. 3. The transmitter synchronizing signal on the line 116 is provided by a video amplifier 202 in response to an RF detector 204 that receives a small sample of the transmitter pulse derived by a microwave coupler 206 from the transmission line 208 that carries the microwave from a transmitter 210 through a duplexer 212 and then over a transmission line 214 to an antenna 216. The RF detector 204 may simply comprise a diode, and the video amplifier 202 is an amplifier whose frequency response is sufficiently low that it ignores the microwave carrier, but senses only the envelope thereof, which is the transmitted pulse. The duplexer 212 applies signals over a line 218 to a mixer 220 that also receives signals from a local oscillator 222, the frequency of which is controlled by an AFC circuit 224 that also derives a signal from the coupler 206. The mixer 220 feeds a linear-logrithmic IF amplifier strip 226, in which the amplifiers perform linear amplification for small input signals, and tend toward logrithmic amplification for large input signals. This improves the gain response of the system. The output of the IF amplifier is fed to a second detector 228 which may comprise a square law detector. It is in the circuit 228 that the doppler frequency of moving targets is beat against or multiplied by the doppler frequency of clutter so as to provide signal components representing frequencies which are the difference between the doppler of a moving target and the doppler bands of clutter. It is these frequencies that are derived, after amplification in the video amplifier 230, at the output of the range gated filters 200 as a result of the filtering described hereinbefore.

Figure 10:
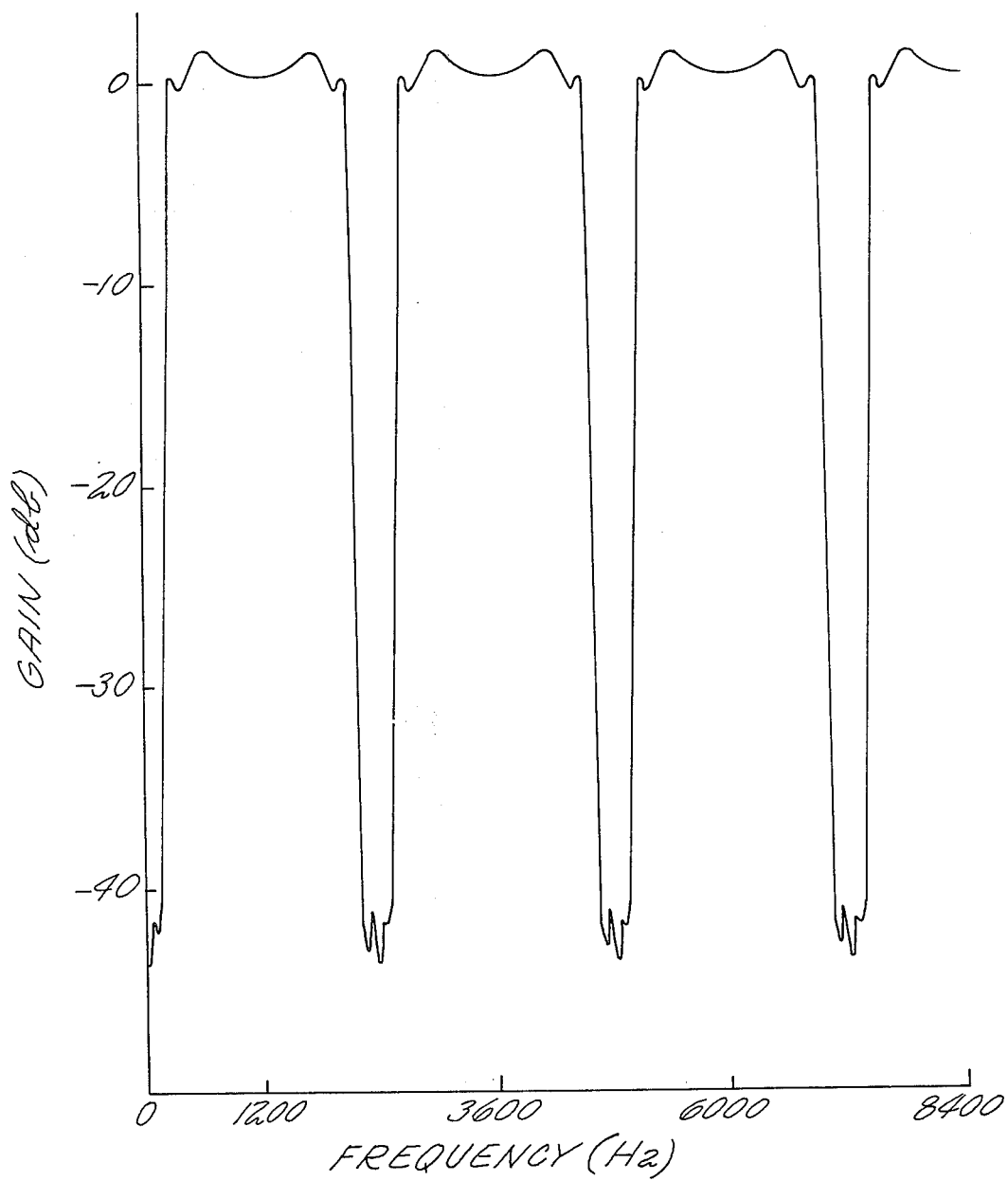
FIG. 10 is a diagram illustrative of typical filter characteristics for filters in accordance with the invention.

FIG. 10 illustrates the frequency response of a particular 4th order filter which comprises two 2nd order filters, of the type shown in FIG. 1, connected in series. This particular filter is designed to work with a PRF of 2,400 Hz, since the reject bands are centered about 2,400 Hz, and are on the order of four or five hundred Hz wide. The characteristics are changed, in accordance with the principles set forth in Rader and Gold (hereinbefore), by changing the values of the constants, particularly the values of the resistors which govern the constants K1, K2, L1 and L2. Although variation of the K's and that L's interact with each other, the K's primarily determine the bandwidth of the passband, and the L's are primarily instrumental in governing the steepness of the skirts.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. An Mth order integrating filter comprising:
    input means receiving a time varying electrical signal to be filtered;
    timing means providing first and second sequences of related timing signals, said first sequence timing signals appearing at times other than the times of appearance of said second sequence timing signals;
    quantizer means responsive to said input means for sampling said signal to be filtered in response to said first sequence of timing signals, said quantizer means presenting between successive ones of said first sequence of timing signals a voltage representative of the magnitude of the signal to be filtered at the time of sampling;
    first and second voltage summation means, each having at least M inputs with different scale factors, said quantizer means being connected to a first input of said first summation means the output of said first summation means being connected to a first input of said second summation means, the output of said second summation means comprising the output of said filter;
    a plurality of voltage storage means, there being at least as many as there are inputs to one of said summation means; and
    electronic switch means responsive to said timing means for connecting each of said storage means, in a cyclically repetitive sequence in response to successive ones of said second sequence of timing signals, first to said first input of said second summation means, second to second inputs of both said first and second summation means, and, if there are more than two inputs to said summation means, successively to successive inputs of both said first and second summation means, each of said summation means inputs being connected to only one of said storage means at any one time, each of said storage means being connected according to a different step in the related cyclically repetitive sequence at any one time.

2. A filter according to claim 1 wherein said quantizer means comprises an input voltage storing means and an electronic switch for connecting said input means to said input voltage storing means in response to said first sequence of timing signals.

3. A filter according to claim 2 wherein said input voltage storing means comprises a capacitor feeding a high impedance amplifier, the output of said high impedance amplifier being connected to said first input of said first summation means.

4. A filter according to claim 1 wherein said voltage storage means each comprise a capacitor and wherein the second and subsequent inputs to said summation means each include high impedance amplifiers.

5. A filter according to claim 1 wherein each of said summation means comprises an operational amplifier having its first input providing a gain of unity, and other inputs providing gains other than unity.

6. A filter according to claim 1 wherein: said electronic switch means comprises a plurality of electronic multiplexer circuits, each having a related input connected to one of said voltage storage means and a plurality of related outputs, a selected one of said related outputs being connected to said related input in response to digital operating signals applied thereto; and
    said timing means includes means providing said second sequence of timing signals in the form of a cyclically repetitive sequence of digital signals for controlling said multiplexer circuits.

7. An integrating processor comprising a filter according to claim 1 wherein:
    said quantizer means comprises a pair of input voltage storing means, each responsive to alternative ones of said first sequence of timing signals for sampling said signal to be filtered, and electronic switch means for alternatively connecting one of said input voltage storing means to said first input of said first summation means in response to opposite alternative ones of said first sequence of timing signals;
    each of said voltage storage means comprises a plurality of capacitors and a plurality of corresponding storage electronic switches; and
    said timing means produces a sequence of signals including a third sequence of a series of distinct timing signals interspersed between each timing signal of said second sequence for operating in succession successive ones of said storage electronic switches and a timing signal of said first sequence corresponding to each of said distinct timing signals.

8. An integrating processor according to claim 7 wherein said third sequence of timing signals comprise series of range gating signals and said first sequence of timing signals comprise one timing signal for each of said range gating signals.

9. A range gated integrating radar video processor comprising:
    input means receiving a time varying electrical signal to be filtered;
    timing means providing first and second sequences of related timing signals, said first sequences timing signals appearing at times other than the times of appearance of said second sequences timing signals, said timing means providing a plurality of said first sequences of timing signals, each related to a different range gate;
    a plurality of quantizer means, each responsive to said input means for sampling said signal to be filtered in response to a corresponding one of said first sequences of timing signals, said quantizer means presenting, between successive ones of a related first sequence of timing signals, a voltage representative of the magnitude of the signal to be filtered at the time of sampling;

a plurality of sets of first and second voltage summation means, each having at least M inputs with different scale factors, each of said quantizer means being connected to a first input of a related one of said first summation means, the output of each first summation means being connected to a first input of the second summation means of the same set, the output of said second summation means comprising the output of said processor;

a plurality of sets of voltage storage means, one set for each set of said summation means, there being at least as many in each set as there are inputs to each of said summation means; and a plurality of electronic switch means, one for each of said sets, each responsive to said timing means for connecting each of said storage means to the related summation means in a cyclically repetitive sequence in response to successive ones of said second sequence of timing signals, first to said first input of said second summation means, second to second inputs of both said first and second summation means, and, if there are more than two inputs to said summation means, successively to successive inputs of both said first and second summation means, each of said summation means inputs being connected to only one of said storage means at any one time, each of said storage means being connected according to a different step in the related cyclically repetitive sequence at any one time.

* * * * *

UNITED STATES PATENT OFFICE
CERTIFICATE OF CORRECTION

PATENT NO. : 3,914,763
DATED : October 21, 1975
INVENTOR(S) : H. Green, R. A. Guarino and J. H. Fitzgerald It is certified that error appears in the above-identified patent and that said Letters Patent are hereby corrected as shown below:

Column 1, line 6, "2." should read --1.--

Column 4, line 1, "$3W_n$" should read --$W_n$--

Column 4, line 4, "$4Y_n$" should read --$Y_n$--

Column 4, lines 17 and 18, "subscription" should read

--subscript--

Column 5, line 60, Table II, "Swi-" should read --Switch--

Column 6, line 4, Table II, "Swi-" should read --Switch--

Column 7, line 48, after "flip" insert --flop--

Signed and Sealed this tenth Day of February 1976

[SEAL]

Attest:

RUTH C. MASON
Attesting Officer

C. MARSHALL DANN
Commissioner of Patents and Trademarks